Patented Oct. 26, 1937

2,097,345

UNITED STATES PATENT OFFICE

2,097,345

RESINOUS COMPOSITION

Henry S. Rothrock, Wilmington, Del., assignor to E. I. du Pont de Nemours & Company, Wilmington, Del., a corporation of Delaware No Drawing. Application May 1, 1935, Serial No. 19,302

6 Claims. (Cl. 260—4)

This invention relates to new compositions of matter, and more particularly to certain phenol-aldehyde condensation products and compositions containing them.

This invention has as an object the manufacture of new phenol-aldehyde condensation products. Another object is the production of new and useful compositions comprising such condensation products. Other objects will appear hereinafter.

The above and other objects disclosed hereinafter are accomplished by a process which includes condensing a polynuclear phenolic monocarboxylic acid of the type described hereinafter with an aldehyde, preferably formaldehyde, in the presence of a suitable condensing agent.

In carrying out my invention I condense with formaldehyde a polynuclear phenolic monocarboxylic acid containing the carboxyl and hydroxyl groups attached to different carbocyclic nuclei which are separated by a single carbon atom. An example of a polynuclear phenol of this kind is o-(4-hydroxy-benzyl)benzoic acid whose structure is as follows:

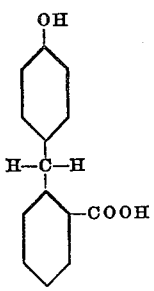

The condensation product obtained by reacting the above phenolic monocarboxylic acid with formaldehyde is not only useful in itself but is also a valuable intermediate for the manufacture of various compounds and compositions through the interaction of the carboxyl group with monohydric alcohols, polyhydric alcohols, and mixtures of polyhydric alcohols with mono and/or polycarboxylic acids.

In the preferred embodiment of this invention the condensation reaction with the aldehyde is carried out as follows. The polynuclear phenolic monocarboxylic acid, aldehyde, and catalyst are mixed in a vessel provided with a reflux condenser, stirrer, and thermometer and the mixture refluxed until the desired degree of condensation is attained. The product formed is separated, washed with water, and dried by heating it preferably at temperatures below 100° C. either at atmospheric pressure or in a vacuum oven.

The following examples are illustrative of the methods used in carrying out my invention:

Example I

A mixture of 22.8 grams of o-(4-hydroxybenzyl)benzoic acid (m. p. 150° C.), 10.8 grams of 37% aqueous formaldehyde solution, 4.5 grams sodium hydroxide, and 5 grams of water was charged into a 200 cc. round-bottom, two-neck flask equipped with a stirrer, reflux condenser, and thermometer and the mixture refluxed for 18 hours, at the end of which time the reaction product was a clear, amber-colored, soft resin. The resin was decanted from the water, neutralized with dilute hydrochloric acid, filtered, washed free of chlorides, and dried at 85° C. The product obtained was a white resinous solid, soluble in acetone and alkalis, and was not convertible to an insoluble, infusible product by heat-treatment at 100° C. for 16 hours.

Example II

This example shows the effect of variations in the ratio of formaldehyde to polynuclear phenolic monocarboxylic acid on the properties of the resulting condensation product.

A mixture of 22.8 grams of o-(4-hydroxybenzyl)benzoic acid (m. p. 150° C.), 16.2 grams of 37% aqueous formaldehyde solution, 4.5 grams of sodium hydroxide and 10 grams of water was charged into a 200 cc. round-bottom, two-neck flask equipped with a stirrer, reflux condenser, and thermometer and heated in exactly the same manner as described under Example I. The product obtained became insoluble in aromatic hydrocarbon solvents after standing overnight at room temperature, and could be converted to an insoluble, infusible material by heating for one hour at 100° C.

The o-(4-hydroxybenzyl)benzoic acid used in the above examples may be conveniently prepared by reduction of o-(4-hydroxyphenyl)phthalide, for example, with metallic zinc in alkaline solution.

The polynuclear phenolic monocarboxylic acid mentioned in the examples may be replaced by o-(4-hydroxybenzoyl)benzoic acid, bis(4-hydroxyphenyl)-2-carboxyphenylmethane, bis(3-methyl-4-hydroxyphenyl)-2-carboxyphenylmethane, bis(3-chloro-4-hydroxyphenyl)-2-carboxyphenylmethane, bis(4-hydroxyphenyl)-2-carboxy-5-methylphenylmethane, and other polynuclear phenolic monocarboxylic acids containing the hydroxyl and carboxyl groups attached to different carbocyclic nuclei which are separated by a single carbon atom.

In place of the formaldehyde of the examples, there may be used other aldehydes, e. g., acetaldehyde, benzaldehyde, furfuraldehyde, trioxymethylene, paraldehyde, propionaldehyde, isovaleraldehyde, acrolein, etc.

In place of the sodium hydroxide of the examples, there may be used ammonium chloride, ammonia, or an acid catalyst such as hydrochloric acid, sulfuric acid, etc.

An important application of the condensation products disclosed in the examples is in the production of water-soluble paints. An example of a composition of this type is given below:

Example III

To 43.8 grams of the condensation product of Example I suspended in 150 grams of water are added slowly 12.2 grams of ammonium hydroxide (28 to 29% NH$_3$) and the mixture stirred until solution is complete. Films cast from the resulting solution become insoluble and infusible upon heat-treatment for about one hour at 100–150° C. Valuable baking enamels may be obtained by inclusion of the usual pigments.

The above solution alone or combined with other water-soluble materials, e. g., casein, waterglass, natural and synthetic rubber latices, and water-soluble salts of polyhydric alcohol-polycarboxylic acid resins, are highly useful as impregnating and coating agents for paper, cloth, porous stone and other bibulous objects.

As previously indicated the aldehyde-phenolic condensation products of the present invention may be reacted with various alcoholic compounds for the production of esters having wide use in the coating art.

Esters varying in consistency from fluid to soft balsamic products and which are highly useful in cellulose derivative compositions are made by reacting the formaldehyde condensation products of the examples with monohydric alcohols, e. g., ethyl, butyl, isobutyl, amyl, isoamyl, allyl, dodecyl, ricinoleyl, abietyl, mono- and dihydroabietyl, and fenchyl alcohols, terpineol, cyclohexanol, borneol, and isoborneol, alcohols obtained by carboxyl reduction of fatty oils and fatty oil acids, octadecyl alcohol, the higher alcohols obtained by hydrogenation of carbon oxides, etc.

Esters varying in consistency from soft balsamic products to hard resins, and which are useful per se or combined with cellulose derivatives, natural or synthetic resins in the coating, impregnating, or molding arts are obtained by reacting the formaldehyde condensation product of o-(4-hydroxybenzyl)benzoic acid with polyhydric alcohols, e. g., glycerol, polyglycerols, ethylene glycol, diethylene glycol, tetramethylene glycol, hexamethylene glycol, decamethylene glycol, octadecanediol, etc.

An example of a polyhydric alcohol ester of the formaldehyde condensation product of o-(4-hydroxybenzyl)benzoic acid is the following:

Example IV

A mixture of 43.8 grams (0.1 mol.) of the condensation product of Example I and 10.6 grams (0.1 mol.) of diethylene glycol was placed in a flask fitted with a stirrer, condenser, and thermometer and heated at about 200° C. for one hour. A soft balsamic resin, which was compatible with cellulose derivatives, was obtained.

Mixed esters which are highly useful in coating compositions are obtained by using the formaldehyde condensation product of o-(4-hydroxybenzyl)benzoic acid as a modifying agent for polyhydric alcohol-polycarboxylic acid resins. An example of such a product is the following:

Example V

A mixture of 33.62 grams of linseed oil acids, 20.48 grams of glycerol, and 34.81 grams of phthalic anhydride was placed in a flask fitted with a condenser, stirrer, and thermometer and heated at 190° C. for one hour and fifty minutes, at the end of which time 19 grams of the condensation product of Example I was added, and the mixture heated at 200° C. to an acid number of 75. The product obtained was a clear, tough resin which was soluble in hydrocarbon solvents, esters, and ketones.

A varnish was made by dissolving 30.5 grams of the above resin in 56.5 grams of toluene, and adding thereto sufficient cobalt linoleate drier solution to give 0.02% cobalt as metal, based on the oil content of the resin. The varnish made from this resin had better water-resistance and drying properties than a similar varnish made from a 35% linseed oil modified glycerol phthalate resin.

The phthalic anhydride of the example may be replaced in whole or in part by other resinifying polycarboxylic acids, e. g., succinic, adipic, malic, maleic, sebacic, tartaric, chlorophthalic, ketosuccinic, azelaic, naphthalic, etc.

Highly useful compositions may be made by replacing the glycerol of the example in whole or in part by other polyhydric alchols, e. g., ethylene glycol, diethylene glycol, hexamethylene glycol, erythritol, pentaerythritol, octadecanediol, etc.

The linseed oil acids may be replaced in whole or in part by other monobasic acids, e. g., acids derived from drying, semi-drying and non-drying oils, e. g., Japanese wood oil acids, soya bean oil acids, corn oil acids, castor oil acids, oleic acid, etc., stearic acid, lauric acid, acrylic acid, benzoic acid, etc.

Highly useful mixed esters may be made by replacing the glycerol of the example in part with monohydric alcohols, e. g., amyl, dodecyl, octadecyl, etc.

Polyhydric alcohol-polycarboxylic acid resins modified with the formaldehyde condensation product of the kind disclosed in Examples I and II may be combined with oils and cellulose derivatives, and thus find useful application in the manufacture of plastics, coating and impregnating compositions. They may be combined by heating, by mutual solvents, or by other means with one or more of the following substances: drying and semi-drying oils, cellulose derivatives, e. g., nitrocellulose, ethyl cellulose, benzyl cellulose, etc.; natural and synthetic resins, e. g., rosin, kauri, vinyl resins, phenol-aldehyde resins, acrylic and methacrylic ester polymers, etc.; hydrogenated natural and synthetic resins, e. g., hydrogenated phenol-aldehyde resins, hydrogenated rosin, etc.; hydrogenated resin acid esters, e. g., hydrogenated ester gum, etc.

To the resins modified with any one of the above enumerated materials may be added pigments, fillers, dyes, solvents, driers, etc., as needed and desired.

It will be apparent from the foregoing that I have disclosed phenol-aldehyde condensation products which are not only new and useful in themselves but which are valuable intermediates for the manufacture of a wide variety of softeners, balsamic and resinous compositions.

As many apparently widely different embodiments of this invention may be made without departing from the spirit and scope thereof, it is to be understood that I do not limit myself to the specific embodiments thereof except as defined in the appended claims.

I claim:

1. The resinous condensation product of aldehyde and o-(4-hydroxylbenzyl)benzoic acid.

2. The resinous condensation product of formaldehyde and o-(4-hydroxybenzyl)benzoic acid.

3. A process for making resins which comprises reacting formaldehyde and o-(4-hydroxybenzyl)-benzoic acid.

4. A composition of matter comprising the resinous reaction product of an alcohol and the acid condensation product of reactants consisting essentially of aldehyde and a dinuclear phenolic monocarboxylic acid containing the phenolic hydroxyl and carboxyl groups attached to different carbocyclic nuclei which are separated by a single methylene group and which are directly joined to the carbon atom of said group.

5. A resinous ester obtained by reacting polyhydric alcohol with a mixture comprising a resinifying polycarboxylic acid and the acid condensation product of reactants consisting essentially of aldehyde and a polynuclear phenolic monocarboxylic acid containing the phenolic hydroxyl and carboxyl groups attached to different carbocyclic nuclei which are separated by a single methylene group and which are directly joined to the carbon atom of said group.

6. A composition of mater comprising the resinous condensation product of reactants consisting substantially only of aldehyde and a polynuclear, monohydric, phenolic monocarboxylic acid containing the carboxyl group and phenolic hydroxyl group on different carbocyclic nuclei which are separated by a single carbon atom.

HENRY S. ROTHROCK.